(12) United States Patent
Nishida

(10) Patent No.: US 8,809,470 B2
(45) Date of Patent: *Aug. 19, 2014

(54) POLYMERIZABLE COMPOSITION

(75) Inventor: Hirofumi Nishida, Hyogo (JP)

(73) Assignee: Nagase Chemtex Corporation, Osaka (JP)

(*) Notice: Subject to any disclaimer, the term of this patent is extended or adjusted under 35 U.S.C. 154(b) by 1173 days.

This patent is subject to a terminal disclaimer.

(21) Appl. No.: 11/661,208

(22) PCT Filed: Aug. 24, 2005

(86) PCT No.: PCT/JP2005/015319
§ 371 (c)(1),
(2), (4) Date: Oct. 30, 2007

(87) PCT Pub. No.: WO2006/022278
PCT Pub. Date: Mar. 2, 2006

(65) Prior Publication Data
US 2008/0139758 A1 Jun. 12, 2008

(30) Foreign Application Priority Data
Aug. 25, 2004 (JP) ................................. 2004-245724

(51) Int. Cl.
C08G 59/40 (2006.01)
C08G 59/42 (2006.01)
C08L 63/00 (2006.01)

(52) U.S. Cl.
CPC ........ *C08G 59/4007* (2013.01); *C08G 59/4207* (2013.01); *C08G 59/40* (2013.01); *C08L 63/00* (2013.01)
USPC ............................................ 525/533; 528/95

(58) Field of Classification Search
CPC . C08G 59/4007; C08G 59/4207; C08L 63/00
USPC ............................................ 525/533; 528/95
See application file for complete search history.

(56) References Cited

U.S. PATENT DOCUMENTS 3,907,706 A * 9/1975 Robins ........................... 502/164
3,956,241 A * 5/1976 Steele et al. .................... 528/92
(Continued)

FOREIGN PATENT DOCUMENTS

JP 06-116366 4/1994
JP 11-115025 4/1999
(Continued)

OTHER PUBLICATIONS

Blank et al. "Catalysis of the Epoxy-Carboxyl Reaction", International Waterborne, High-Solids and Powder Coatings Symposium, Feb. 2001.*

Primary Examiner — Michael Pepitone
Assistant Examiner — Michael A Salvitti
(74) Attorney, Agent, or Firm — Edwards Wildman Palmer LLP

(57) ABSTRACT

A polymerizable epoxy compound composition containing an anionic polymerization initiator which can be easily produced, can attain a high polymerization rate and a high degree of polymerization, and can realize an epoxy polymer having properties unobtainable so far, an improvement in cured polymer properties, etc.; and a method of polymerizing an epoxy compound. The composition is an anionically polymerizable composition comprising a monofunctional epoxy compound or a di- or more functional epoxy resin and a polymerization initiator, the polymerization initiator comprising the potassium or sodium salt of a monocarboxylic acid monomer. The method, which is for producing a polymer of epoxy compounds, comprises polymerizing a monofunctional epoxy compound or a di- or more functional epoxy resin by anionic polymerization with the aid of the potassium or sodium salt of a monocarboxylic acid monomer.

6 Claims, 3 Drawing Sheets

(56) References Cited

U.S. PATENT DOCUMENTS

| | | | |
|---|---|---|---|
| 4,186,086 A * | 1/1980 | Ward | 210/683 |
| 4,485,221 A * | 11/1984 | Krueger et al. | 525/507 |
| 4,711,911 A * | 12/1987 | Blount | 521/123 |
| 4,769,437 A * | 9/1988 | Blount | 528/95 |
| 4,804,427 A * | 2/1989 | Paul et al. | 156/181 |
| 5,212,261 A * | 5/1993 | Stierman | 525/506 |
| 5,922,633 A * | 7/1999 | Nakane et al. | 502/155 |
| 6,214,269 B1 * | 4/2001 | Fujita et al. | 264/176.1 |
| 6,291,554 B1 * | 9/2001 | Chen et al. | 523/404 |
| 6,599,960 B1 * | 7/2003 | Eckhardt et al. | 523/109 |
| 6,784,221 B2 * | 8/2004 | Roth et al. | 522/51 |
| 7,001,938 B2 * | 2/2006 | Watkins et al. | 523/461 |
| 8,530,053 B2 * | 9/2013 | Nishida et al. | 428/413 |
| 2004/0147690 A1 * | 7/2004 | Watkins et al. | 525/523 |
| 2004/0260039 A1 * | 12/2004 | Yoshimura et al. | 525/533 |
| 2005/0065295 A1 * | 3/2005 | Christiansen et al. | 525/523 |
| 2008/0015274 A1 * | 1/2008 | Burdeniuc et al. | 521/118 |
| 2008/0139698 A1 * | 6/2008 | Nishida et al. | 523/205 |
| 2008/0139758 A1 * | 6/2008 | Nishida | 525/533 |
| 2009/0215929 A1 * | 8/2009 | Nishida et al. | 523/468 |

FOREIGN PATENT DOCUMENTS

| | | |
|---|---|---|
| JP | 2004-204186 | 7/2004 |
| JP | 2004-353141 | * 12/2004 |

* cited by examiner

POLYMERIZABLE COMPOSITION

CROSS-REFERENCE TO PRIOR APPLICATIONS

This application is a 35 USC §371 national phase filing of international application number PCT/JP2005/015319, which was filed on 24 Aug. 2005, and which claims priority to Japanese Patent Application Serial No. 2004-245724 which was filed on 25 Aug. 2004, both of which are incorporated by reference.

FIELD OF THE INVENTION

The present invention relates to a polymerizable epoxy compound composition using, as an anionic polymerization initiator, an alkali metal salt of a weak acid monomer having an organic group and to a method of polymerizing an epoxy compound using, as an anionic polymerization initiator, an alkali metal salt of a weak acid monomer having an organic group.

BACKGROUND ART

Epoxy compounds are led to ring-opening polymers by a ring-opening reaction of an epoxide. For example, epoxy resins which are compounds having two or more epoxy groups in their molecules undergo a ring-opening reaction of an epoxide by the action of a curing catalyst to form a polymer having a three-dimensional structure. An amine type compound or Lewis acid is usually used as an epoxy resin curing catalyst.

In this ring-opening reaction of an epoxide, when a nucleophilic reagent such as an amine exists, an anion is produced and polymerizes an epoxy ring ionically. Also, in the case where, for example, an acid hydride is reacted with a tertiary amine to generate a carboxylate anion, this anion is reacted with an epoxy group to cause a curing of a resin. As mentioned above, an anionic polymerization process is involved in the ring-opening polymerization of an epoxy compound. The epoxy curing catalyst which induces anionic polymerization and has been conventionally used in general may be said to be one which induces a reaction with an epoxy group by forming the anion mentioned above.

As materials having such a reaction mechanism, for example, an imidazole catalyst type curing agent and the like are known, wherein an anion produced by a reaction between the curing agent and an epoxy group is supplied to a reaction with an epoxy group. On the other hand, an epoxy resin composition prepared by compounding an ion-containing polymer in an epoxy resin is disclosed (see, for example, Patent Document 1). In the above patent document, an ion-containing polymer is used as a curing agent in an epoxy resin to thereby obtain a cured product exhibiting very excellent heat resistance. However, the production of the ion-containing polymer is usually difficult and it is therefore difficult to obtain various polymers as the ion-containing polymers with ease. Also, the above composition uses an epoxy resin as the epoxy compound to thereby generate a crosslinked epoxy cured product.

The improvement of the physical property of a polymer of an epoxy compound relates to a theme which opens up the following possibilities. Specifically, if a polymer of monofunctional epoxy compound having a high degree of polymerization can be obtained, it is expected to be a polymer differing entirely in physical properties from conventional crosslinking type epoxy resins. Also, in the case of a polymer of a di- or more functional epoxy resin, it is expected to obtain a high-crosslinking density polymer without a scarcely crosslinked part and hence high uniformity. There are the possibilities that these epoxy polymers (means a ring-opening polymer of an epoxide, the same as follows) exhibit thermal plasticity or unique physical property in, for example, physical strength. Such a polymer may be said to comply with the demand in the technical field concerned in which it is demanded of epoxy resins to have more excellent physical property correlating with technical innovation in an industrial field.

Therefore, the inventors study concerning a novel anionic polymerization initiator that has not been tried to use it in conventional epoxy curing agents and curing promoters will realize the expectations for the possibility of easy production of a polymerization initiator, high polymerization reaction rate, a high degree of polymerization, attainment of an epoxy polymer having physical properties that have not been found in conventional epoxy polymers and an improvement in cured properties.

Patent Document 1: Publication of Japanese Patent Application Laid-Open (JP-A) No. 2004-204186.

SUMMARY OF THE INVENTION

Problem to be Solved by the Invention

In view of the above situation, it is an object of the present invention to provide a polymerizable epoxy compound composition prepared by compounding an anionic polymerization initiator which can attain an easy production of a polymerization initiator, a high reaction rate of polymerization and high degree of polymerization and can realize an epoxy polymer having physical properties that have not been found in conventional epoxy polymers and an improvement in the cured properties, and to provide a method of polymerizing an epoxy compound.

Means for Solving Problem

The inventors of the present invention have found that when an ion-containing polymer is compounded in an epoxy resin, a cured epoxy resin is obtained without using an epoxy resin curing agent such as an aliphatic polyamine, amidoamine, polyamide, aromatic polyamine, acid anhydride, Lewis base and polymercaptan and also, that the cured epoxy resin exhibits very excellent heat resistance and also found that an alkali metal salt of a weak acid monomer having an organic group serves as an anionic polymerization initiator by further studies based on this finding. The present invention was completed based on this unexpected finding.

Accordingly, the present invention relates to a polymerizable composition comprising an epoxy compound and a polymerization initiator, wherein the polymerization initiator comprises an alkali metal salt of a weak acid monomer having an organic group.

In one embodiment of the present invention, the above alkali metal salt of a weak acid monomer having an organic group contains, as a conjugate base, at least one member selected from the group consisting of a conjugate base of a carboxylic acid group, conjugate base of a phosphoric acid group, conjugate base of boric acid group, conjugate base of a silicic acid group, conjugate base of a thiol group and conjugate base of a phenolic hydroxyl group.

In a further embodiment of the present invention, the above alkali metal salt of a weak acid monomer having an organic group is a salt of at least one alkali metal selected from the group consisting of Li, Na, K, Rb and Cs and particularly a salt of Na or K.

In a still further embodiment, the above epoxy compound is a monofunctional epoxy compound or a di- or more functional epoxy resin having at least one member selected from the group consisting of a glycidyloxy group, glycidylamino group and 3,4-epoxycyclohexenyl group.

The present invention also relates to a method of producing an epoxy compound polymer, comprising anion-polymerizing an epoxy compound using an alkali metal salt of a weak acid monomer having an organic group.

Effect of the Invention

The present invention produces the following effects due to the above structure.

(1) An epoxy compound can be polymerized by using an alkali metal salt of a weak acid monomer having an organic group.
(2) A polymer is produced at a high reaction rate.
(3) A termination reaction and a chain transfer are scarcely caused and it is therefore possible to attain a high degree of polymerization of an epoxy compound.
(4) It is easy to produce an anionic polymerization initiator.
(5) The resin strength and toughness of the cured product are high.
(6) A polymer of a monofunctional epoxy compound having a high degree of polymerization can be produced.
(7) A linear and long polymer is formed by polymerizing a monofunctional epoxy compound, whereby a thermoplastic polymer can be produced.
(8) The anionic polymerization initiator of the present invention has a relatively low hygroscopicity, which enables working in the air.
(9) A high heat-resistance resin that has substantially no Tg that can be observed as the local maximum value of loss tangent can be produced by polymerizing a di- or more functional epoxy compound.

PREFERRED EMBODIMENTS OF THE INVENTION

Figure 1:
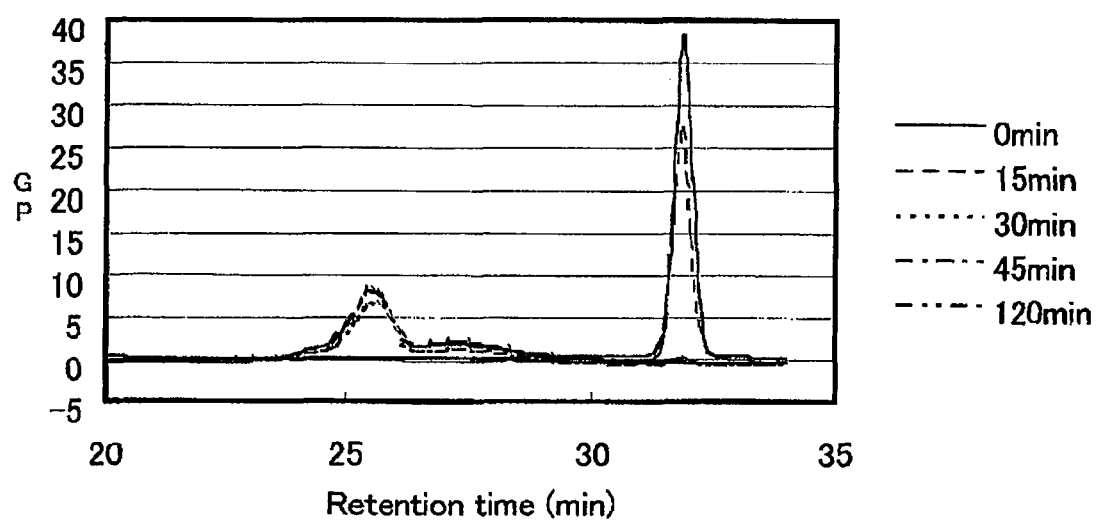
FIG. 1 is a GPC chart in Example 2.

An epoxy compound of the present invention may not be particularly limited as far as it is a compound having an epoxy group and may be a monofunctional epoxy compound or a di- or more epoxy resin. Examples of the monofunctional epoxy compound may include mononucleus aromatic monoepoxy compounds having one benzene ring such as phenyl glycidyl ether and sec-butylphenyl glycidyl ether, allyl glycidyl ether, 2-ethylhexyl glycidyl ether and further a monoepoxy compounds derived from alcohols such as a glycidyl ether of pentaethylene glycol monophenyl ether. These compounds may be used either singly or in combinations of two or more.

As the di- or more functional epoxy resin, for example, various known epoxy resins may be used. Examples of these epoxy reins may include mononucleus aromatic epoxy compounds having one benzene ring such as catechol diglycidyl ether, resorcin diglycidyl ether, phthalic acid diglycidyl ether (YDC-1312, manufactured by Tohto Kasei Co., Ltd.), 2,5-diisopropylhydroquinone diglycidyl ether, hydroquinone diglycidyl ether, phloroglucinol PEG (manufactured by Nagase ChemteX Corporation); alicyclic epoxy resins such as Celloxide 2021P (manufactured by Daicel Chemical Industries, Ltd.) and CY175 (manufactured by Ciba Specialty Chemicals Inc.); bisphenol type epoxy resins such as bis(4-hydroxyphenyl)methane diglycidyl ether, bis(4-hydroxyphenyl)ethane diglycidyl ether, bis (4-hydroxyphenyl) propane diglycidyl ether, and bisphenol S type epoxy resins (EX-251, manufactured by Nagase ChemteX Corporation) as well as oligomer mixtures obtained by partial condensation thereof and nuclear hydrogenated epoxy resins thereof; tetramethyl-bis(4-hydroxyphenyl)methane diglycidyl ether and tetramethylbis (4-hydroxyphenyl) ether diglycidyl ether; biphenyl type or tetramethylbiphenyl type epoxy resin (YX-4000, manufactured by Japan Epoxy Resins Co, Ltd.) and nuclear hydrogenated type epoxy resins thereof; fluorene type epoxy resins such as bisphenolfluorene type or biscresolfluorene type epoxy resins (BCF Diglycidyl Ether, manufactured by Nagase ChemteX Corporation and BPEF Diglycidyl Ether, manufactured by Nagase ChemteX Corporation); naphthalene type epoxy resins such as HP-4032D (manufactured by Dainippon Ink and Chemicals Incorporated), EXA-4750. (manufactured by Dainippon Ink and Chemicals Incorporated) and EXA-4700 (manufactured by Dainippon Ink and Chemicals Incorporated); polyfunctional glycidylamines such as ELM-100 (manufactured by Sumitomo Chemical Co., Ltd.) and MY721 (manufactured by Ciba Specialty Chemicals Inc.); dicyclopentadiene type epoxy resins such as ZX-1257 (manufactured by Tohto Kasei Co., Ltd.) and HP-7200 (manufactured by Dainippon Ink and Chemicals Incorporated); novolac type epoxy resins such as RE-305 (manufactured by Nippon Kayaku Co., Ltd.), EOCN-4500 (manufactured by Nippon Kayaku Co., Ltd.) and EPPN-501H (manufactured by Nippon Kayaku Co., Ltd.); polyfunctional glycidyl ethers such as Epikote 1032H60 (manufactured by Japan Epoxy Resin Company), Epikote 1031S (manufactured by Japan Epoxy Resin Company) and TECHMORE VG3101 (manufactured by Mitsui Chemicals, Inc.) and other epoxy resins, for example, silylated epoxy resins (Silylated GY260, manufactured by Nagase ChemteX Corporation), heterocyclic epoxy resins (CY350, manufactured by Nagase ChemteX Corporation and triglycidyl isocyanurate), diglycidyl ether of bisphenol A propylene oxide adduct, diglycidyl ether of bisphenol A ethylene oxide adduct and diallylbisphenol A type epoxy resin. These compounds may be used either singly or in combinations of two or more. Also, a combination of a monofunctional epoxy resin and a di- or more functional epoxy resin may be used.

As the polymerization initiator in the present invention, an alkali metal salt of a weak acid monomer having an organic group is used. Examples of the alkali metal salt of a weak acid monomer having an organic group include alkali metal salts of a monofunctional weak acid monomer having an organic group, which are represented by the formula R-A$^-$M$^+$, for example, alkali metal salts of monofunctional carboxylic acid, thiol and phenol, or alkali metal salts of a monofunctional weak acid having an organic group other than an organic acid, for example, alkali metal salts of phosphoric acid having an organic group, boric acid having an organic group or silicic acid having an organic group. In the formula, R represents an organic group, A$^-$ represents a conjugate base of a weak acid group AH and M represents an alkali metal. Examples of the above organic group include, though not particularly limited to, monovalent hydrocarbon groups such as a saturated aliphatic hydrocarbon group, alicyclic hydrocarbon group and aromatic hydrocarbon group.

Specific examples of the alkali metal salts of a weak acid monomer having an organic group include alkali metal salts of monofunctional carboxylic acids such as lauric acid, n-caprylic acid, cyclohexanecarboxylic acid, 3-cyclohexylpropionic acid, phenylacetic acid, acetic acid, stearic acid, versatic acid and 2-ethylhexanoic acid; alkali metal salts of thiols such as mercaptobenzothiazole and 2-mercaptoethylsulfide; alkali metal salts of phenols such as p-t-butylphenol; alkali metal salts of phosphoric acids suchasdi-2-ethylhexyl phosphate; alkali metal salts of boric acids such as di-n-octadecyl borate; and alkali metal salts of silicic acids such as stearyldimethylsilanol.

As the above alkali metal salt of a weak acid monomer having an organic group, alkali metal salts of di- or more functional weak acid monomers having an organic group may also be used. Examples of the alkali metal salt of a di- or more functional weak acid include alkali metal salts of organic acids such as phthalic acid, dodecenylsuccinic acid, dodecanedicarboxylic acid and carboxylic acid terminal butadiene/acrylonitrile liquid rubber (difunctional or trifunctional) and alkali metal salts of phenols such as bisphenol A.

If the amount of the alkali metal salt of a di- or more functional weak acid monomer to be compounded is excessive, there is a fear that the weak acid monomer is coagulated and separated. Therefore, when the alkali metal salt of a di- or more functional weak acid monomer is used, the above monofunctional weak acid monomer and the di- or more functional weak acid monomer are used such that the number of functional groups as a whole in these monofunctional and the di- or more functional weak acid monomers is preferably 1.5 or less, more preferably 1.3 or less and even more preferably about 1.2.

The above alkali metal salt of a weak acid monomer having an organic group has a conjugate base of the weak acid group. Examples of the conjugate base of the weak acid group may include a conjugate base of a carboxylic acid group, conjugate base of a phosphoric acid group, conjugate base of a boric acid group, conjugate base of a silicic acid group, conjugate base of a thiol group and conjugate base of aphenolic hydroxyl group. Among these bases, a conjugate base (—COO$^-$) of a carboxylic acid group is preferable.

In the present invention, as the alkali metal salt, a salt of at least one alkali metal selected from the group consisting of Li, Na, K, Rb and Cs is preferable and particularly, a salt of Na or K is preferable from the view point of reactivity and economy.

In the present invention, the above alkali metal salt of a weak acid monomer having an organic group works as a polymerization initiator for polymerizing an epoxy compound. It is therefore unnecessary to contain other curing agent component for curing. This, however, does not exclude the case where a small amount of other known curing agent is compounded to the extent the object of the present invention is not impaired.

The polymerizable composition of the present invention is usually compounded with the alkali metal salt of a weak acid monomer having an organic group in a ratio according to the amount of an anion enabling to react an epoxy group of the epoxy compound. When the alkali metal salt of a weak acid monomer having an organic group is compounded, the curing of the epoxy resin is good, the maximum value of loss tangent is very small at 300° C. or less and may be 0.1 or less at 300° C. or less and 1 Hz, or the local maximum value of loss tangent substantially disappears or is as very small as 0.1 or less as its peak height if it appears. Therefore, it is possible to obtain a resin composition having substantially no Tg that can be observed as the local maximum value of loss tangent.

It is considered in the present invention that self-polymerization of an epoxy ring is made to start by compounding an anion to react with an epoxy group, whereby an ether bond is formed. This reaction is considered to proceed until the epoxy group is consumed. In the present invention, the consumption rate of this epoxy group is high and, as shown by an example in FIG. 1, a monomer is consumed rapidly after the reaction starts and thus polymerization progresses. In addition, a termination reaction and a chain transfer are scarcely caused, resulting in growth of a polymer having a high degree of polymerization. As a result, in the case of a monofunctional epoxy compound, a linear and long polymer is formed. Because this polymer substantially has no crosslinking structure, this polymer can exhibit thermoplasticity though it is an epoxy compound polymer. Also, in the case of a polymer of di- or more functional epoxy resin, a uniform and high-crosslinking density resin excluding a scarcely crosslinked part is formed, with the result that a resin having no Tg as mentioned above is obtained. The reaction amount of an epoxy group may be measured, for example, by the method used to measure the methine peak of an epoxy ring by 1H-NMR and the method used to measure the intensity of 914 cm-1 peak (absorption peak of an epoxy group) by IR.

As to the amount of the anion required to react an epoxy group, it is preferable to formulate the above polymerization initiator so that the ratio of the molar number of anions in the above alkali metal salt of a weak acid monomer having an organic group to the molar number of epoxy groups in the epoxy compound is 0.01 or more. When the formulation amount is lower than the above range, there is a fear that the degree of polymerization is insufficient. The lower limit of the amount is more preferably 0.02 or more. On the other hand, there is no value to be set as the upper limit of the amount of the polymerization initiator. However, if the molar number of the above anions is excessively large as compared with the molar number of epoxy groups in the epoxy compound, the polymerization initiation points are increased and there is therefore a fear that a low degree of polymerization is obtained. Therefore, the upper limit of the ratio is more preferably 2.0 in the present invention.

The polymerizable composition of the present invention may be obtained by a production method involving a process of mixing the epoxy compound with the above alkali metal salt of a weak acid monomer having an organic group in, preferably such a ratio as to obtain the amount of ions enabling an epoxy group of the epoxy compound to be reacted. In the above mixing process, the alkali metal salt of a weak acid monomer having an organic group may be usually mixed in such an amount that the ratio of the molar number of ions to the molar number of epoxy groups of the epoxy compound is preferably 0.01 or more and more preferably 0.02 to 2.0. The above mixing process may be carried out by mixing the epoxy compound with the alkali metal salt of a weak acid monomer having an organic group at room temperature to 100° C.

The above mixing may be carried out using a known method and for example, known means such as a disperser, mixer, kneader, homogenizer and three-roll mill may be used.

The polymerizable composition of the present invention may be further compounded with conventionally known various inorganic fillers to the extent that the effect of the present invention is not impaired. The type and amount of inorganic filler to be compounded may be properly selected corresponding to the use and viscosity of the composition. Examples of the above inorganic filler include a fused silica powder, silica glass powder, crystalline silica powder, glass fiber filler, talc, alumina powder, calcium silicate powder, calcium carbonate powder, antimony oxide powder, barium sulfate powder, titanium oxide powder and aluminum hydroxide powder. When the epoxy resin composition is used in electronic/semiconductor fields, a fused silica powder, silica glass powder or the like which provides a high-purity product and also has a small coefficient of linear expansion is appropriate.

Moreover, the polymerizable composition may be compounded with, for example, various coupling agents, antifoaming agent, stress-reducing agent, rubber particles and pigments to the extent that the effect of the present invention is not impaired.

The polymerizable composition, in particular, the epoxy resin composition can be used as sealing materials or reinforcing materials of semiconductor devices to thereby improve the reliability of various electronic or electric products using said devices. The semiconductor devices can be small-sized and highly densified and can be therefore used in various electronic or electric products.

The present invention will be hereinafter explained in more detail based on examples and comparative examples, however, the present invention is not intended to be limited to these.

The abbreviations in the following tables are as follows.

EX146: p-t-butylphenol glycidyl ether (monofunctional, epoxy equivalent=205 g/eq), manufactured by Nagase ChemteX Corporation.

AER260: Bisphenol A type epoxy resin (difunctional, epoxy equivalent: 190 g/eq), manufactured by Asahi Chemical Industry Co., Ltd.

Fluoroglucinol PGE: Fluoroglucinol triglycidyl ether (trifunctional, epoxy equivalent=117 g/eq), manufactured by Nagase ChemteX Corporation.

CTBN1008SPK: Potassium salt (potassium ion equivalent=1887 g/eq) of CTBN1008SP (carboxylic acid terminal butadiene-acrylonitrile liquid rubber, difunctional, manufactured by Ube Industries Ltd.).

CTBN1009SPK: Potassium salt (potassium ion equivalent=1590 g/eq) of CTBN1009SP (carboxylic acid terminal butadiene-acrylonitrile liquid rubber, trifunctional, manufactured by Ube Industries Ltd.).

ACK: Potassium acetate (potassium ion equivalent=98 g/eq).

CHPK: Potassium n-cyclohexylpropionate (potassium ion equivalent=184 g/eq).

CPK: Potassium n-caprilate (potassium ion equivalent=182 g/eq).

CHK: Potassium cyclohexanecarboxylate (potassium ion equivalent=166 g/eq).

LK: Potassium laurate (potassium ion equivalent=225 g/eq).

STK: Potassium stearate (potassium ion equivalent=332 g/eq).

DDK: Dipotassium dodecanedicarboxylate (potassium ion equivalent=103 g/eq).

EHC-30: Adeca Hardener EHC-30, 2,4,6-trisdimethylaminomethylphenol, manufactured by Asahi Denka Kogyo K.K.

1 MZ: 1-methylimidazole, manufactured by BASF Company.

IK: Potassium salt of ethylene/methacrylic acid copolymer (potassium ion equivalent=464 g/eq), manufactured by Du Pont-Mitsui polychemicals Company, Ltd.

RY200S: Fumed Silica, manufactured by Nippon Aerosil Co., Ltd.

Evaluation of Anionic Polymerizing Ability

Examples 1 to 6 and Comparative Examples 1 to 4

EX146 was used as an epoxide and a polymerization initiator and an amount as shown in Table 1 was used to compound. A three-roll mill was used to prepare a homogeneous composition to initiate a reaction at 180° C. Then, the reaction product was subjected to GPC after the time shown in the table passed, to examine the distribution of molecular weight of the reaction product. The results are shown in Tables 1 to 3. Also, the GPC chart obtained in Example 2 is shown in FIG. 1.

The condition of GPC are as follows.

A GPC Alliance/Empower System manufactured by Nihon Waters K.K. was used and a 2414 differential refractometer (manufactured by Nihon Waters K.K.) was used as a detector to measure. As the column, Shodex KF-802, KF-803 and KF-805 (manufactured by SHOWA DENKO K.K.) were connected in series and then used. THF was used as the eluent, the temperature of the column was set to 40° C. and the flow rate was set to 1 ml/min.

TABLE 1

| Example | Anionic polymerization initiator (compounding amount) | At the start | | 180° C./ 15 min. | | 180° C./ 30 min. | | 180° C./ 45 min. | | 180° C./ 60 min. | | 180° C./ 120 min. | |
|---|---|---|---|---|---|---|---|---|---|---|---|---|---|
| | | Peak molecular weight | Peak area (%) | Peak molecular weight | Peak area (%) | Peak molecular weight | Peak area (%) | Peak molecular weight | Peak area (%) | Peak molecular weight | Peak area (%) | Peak molecular weight | Peak area (%) |
| 1 | LK (2.647 phr) | 200 | 100 | 200 | 1 | 300 | 2 | 300 | 2 | 300 | 2 | 300 | 2 |
| | | | | 300 | 2 | 500 | 8 | 500 | 8 | 500 | 8 | 500 | 8 |
| | | | | 500 | 8 | 800 | 6 | 800 | 6 | 800 | 6 | 800 | 6 |
| | | | | 800 | 6 | 1000 | 5 | 1000 | 5 | 1000 | 5 | 1000 | 5 |
| | | | | 1000 | 5 | 1800 | 12 | 1800 | 12 | 1700 | 11 | 1800 | 12 |
| | | | | 2000 | 17 | 4400 | 68 | 4400 | 67 | 4300 | 68 | 4300 | 67 |
| | | | | 4200 | 62 | | | | | | | | |
| 2 | CPK (2.141 phr) | 200 | 100 | 200 | 98 | 200 | 3 | 200 | 1 | — | — | 300 | 1 |
| | | | | 300 | 1 | 300 | 1 | 300 | 1 | | | 500 | 2 |
| | | | | 800 | 1 | 500 | 1 | 500 | 2 | | | 600 | 1 |
| | | | | | | 600 | 1 | 600 | 1 | | | 800 | 3 |
| | | | | | | 800 | 2 | 800 | 3 | | | 1000 | 3 |
| | | | | | | 1000 | 3 | 1000 | 3 | | | 1900 | 23 |
| | | | | | | 1900 | 21 | 1900 | 23 | | | 5000 | 67 |
| | | | | | | 4900 | 69 | 5000 | 66 | | | | |

TABLE 1-continued

| Example | Anionic polymerization initiator (compounding amount) | At the start | | 180° C./ 15 min. | | 180° C./ 30 min. | | 180° C./ 45 min. | | 180° C./ 60 min. | | 180° C./ 120 min. | |
|---|---|---|---|---|---|---|---|---|---|---|---|---|---|
| | | Peak molecular weight | Peak area (%) | Peak molecular weight | Peak area (%) | Peak molecular weight | Peak area (%) | Peak molecular weight | Peak area (%) | Peak molecular weight | Peak area (%) | Peak molecular weight | Peak area (%) |
| 3 | CHK (1.953 phr) | 200 | 100 | 200 | 87 | 200 | 68 | 200 | 1 | 200 | 1 | 400 | 1 |
| | | | | 400 | 1 | 400 | 1 | 400 | 1 | 400 | 1 | 500 | 3 |
| | | | | 500 | 1 | 500 | 1 | 500 | 2 | 500 | 2 | 800 | 3 |
| | | | | 1800 | 11 | 600 | 1 | 800 | 2 | 800 | 2 | 1000 | 3 |
| | | | | | | 900 | 3 | 1000 | 3 | 1000 | 2 | 3600 | 900 |
| | | | | | | 1100 | 2 | 3600 | 91 | 3600 | 92 | | |
| | | | | | | 2000 | 24 | | | | | | |

TABLE 2

| Example | Anionic polymerization initiator (compounding amount) | At the start | | 180° C./ 15 min. | | 180° C./ 30 min. | | 180° C./ 45 min. | | 180° C./ 60 min. | | 180° C./ 120 min. | |
|---|---|---|---|---|---|---|---|---|---|---|---|---|---|
| | | Peak molecular weight | Peak area (%) | Peak molecular weight | Peak area (%) | Peak molecular weight | Peak area (%) | Peak molecular weight | Peak area (%) | Peak molecular weight | Peak area (%) | Peak molecular weight | Peak area (%) |
| 4 | PAK (2.047 phr) | 200 | 100 | 300 | 1 | — | — | — | — | 300 | 1 | 300 | 2 |
| | | | | 400 | 1 | | | | | 400 | 1 | 500 | 7 |
| | | | | 500 | 7 | | | | | 500 | 7 | 700 | 6 |
| | | | | 700 | 6 | | | | | 700 | 5 | 1000 | 4 |
| | | | | 1000 | 4 | | | | | 1000 | 5 | 1200 | 3 |
| | | | | 1300 | 4 | | | | | 1300 | 4 | 3000 | 78 |
| | | | | 3000 | 77 | | | | | 3000 | 77 | | |
| 5 | CPNa (1.953 phr) | 200 | 100 | 200 | 30 | 200 | 1 | — | — | 200 | 1 | 500 | 2 |
| | | | | 500 | 1 | 500 | 2 | | | 500 | 2 | 800 | 1 |
| | | | | 1000 | 1 | 800 | 1 | | | 800 | 1 | 1100 | 1 |
| | | | | 3800 | 68 | 4200 | 96 | | | 5000 | 96 | 5000 | 96 |
| 6 | CHPK (2.165 phr) | 200 | 100 | 200 | 83 | 200 | 1 | 200 | 1 | — | — | 300 | 1 |
| | | | | 500 | 1 | 300 | 1 | 400 | 1 | | | 500 | 3 |
| | | | | 600 | 1 | 400 | 1 | 500 | 2 | | | 800 | 2 |
| | | | | 900 | 2 | 600 | 2 | 800 | 2 | | | 4300 | 94 |
| | | | | 1100 | 2 | 800 | 2 | 4300 | 94 | | | | |
| | | | | 1600 | 7 | 4300 | 93 | | | | | | |
| | | | | 3500 | 4 | | | | | | | | |

TABLE 3

| Comparative Example | Anionic polymerization initiator (compounding amount) | At the start | | 180° C./ 30 min. | | 180° C./ 60 min. | | 180° C./ 120 min. | | 180° C./ 180 min. | | 180° C./ 240 min. | |
|---|---|---|---|---|---|---|---|---|---|---|---|---|---|
| | | Peak molecular weight | Peak area (%) | Peak molecular weight | Peak area (%) | Peak molecular weight | Peak area (%) | Peak molecular weight | Peak area (%) | Peak molecular weight | Peak area (%) | Peak molecular weight | Peak area (%) |
| 1 | CPNEt (2.882 phr) | 200 | 100 | 200 | 95 | 200 | 94 | 200 | 93 | 200 | 93 | 200 | 92 |
| | | | | 400 | 1 | 400 | 1 | 400 | 2 | 400 | 1 | 400 | 2 |
| | | | | 500 | 4 | 500 | 5 | 500 | 5 | 500 | 6 | 500 | 6 |
| 2 | 1MZ (1.000 phr) | 200 | 100 | 200 | 67 | 200 | 59 | 200 | 48 | 200 | 39 | 200 | 34 |
| | | | | 400 | 3 | 400 | 2 | 400 | 3 | 400 | 3 | 400 | 3 |
| | | | | 500 | 8 | 500 | 9 | 500 | 8 | 500 | 9 | 500 | 9 |
| | | | | 600 | 4 | 600 | 4 | 600 | 4 | 600 | 5 | 600 | 5 |
| | | | | 900 | 18 | 900 | 15 | 900 | 19 | 900 | 20 | 900 | 21 |
| | | | | 1100 | 11 | 1100 | 18 | 1100 | 24 | 1100 | 28 | | |
| 3 | DBU (1.788 phr) | 200 | 100 | 200 | 91 | 200 | 89 | 200 | 88 | 200 | 88 | 200 | 87 |
| | | | | 800 | 6 | 800 | 6 | 400 | 1 | 600 | 1 | 600 | 2 |
| | | | | 900 | 3 | 1000 | 5 | 800 | 5 | 800 | 3 | 1000 | 8 |
| | | | | | | | | 1000 | 6 | 1000 | 8 | 1200 | 3 |
| 4 | EHC-30 (3.118 phr) | 200 | 100 | 200 | 96 | 200 | 92 | 200 | 81 | 200 | 66 | 200 | 55 |
| | | | | 400 | 1 | 400 | 1 | 400 | 2 | 400 | 4 | 400 | 5 |
| | | | | 500 | 3 | 500 | 7 | 500 | 15 | 500 | 22 | 500 | 28 |
| | | | | | | | | 800 | 2 | 800 | 4 | 800 | 6 |
| | | | | | | | | | | 1100 | 4 | 1100 | 6 |

Structure of a Polymer of Monofunctional Epoxy Compounds

It was confirmed from Examples 1 to 6 that the polymer of a monoepoxide was soluble in a solvent and had no crosslinking structure.

Evaluation of Physical Properties of the Cured Product

Examples 7 to 15 and Comparative Examples 5 to 7

The components and amounts shown in Table 4 were used to formulate. These components were mixed to prepare a homogeneous composition. The composition was cured in the following curing condition: curing in the condition of 120° C./2 hours and post-curing in the condition of 180° C./4 hours, to obtain a cured product. A sample cured product having a length of about 20 mm, a width of about 10 to 15 mm and thickness of about 2 mm was subjected to the following tests to measure the storage modulus E' and the loss tangent (tan δ) in dynamic visco-elasticity according to the following methods. The retention factor of storage modulus was found from the storage moduli at 25° C. and 250° C. The retention factor of storage modulus is given by the following equation.

Retention factor of storage modulus=(Storage modulus at 250° C./Storage modulus at 25° C.)×100 (%)

In the case of Comparative Example 6, the data obtained not at 250° C. but at 190° C. was used.

Figure 2:
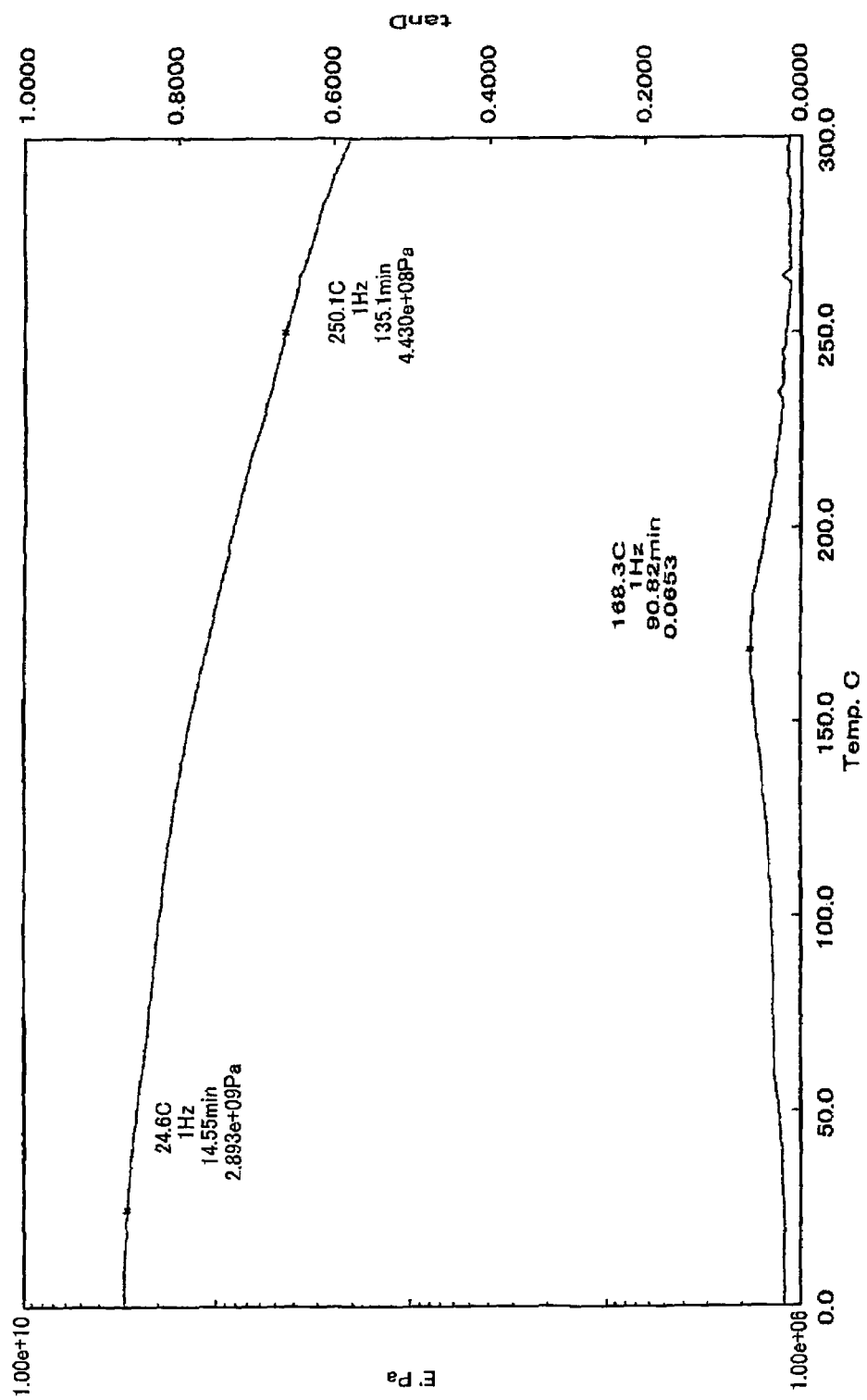
FIG. 2 is a chart of storage modulus E' and loss tangent (tan δ) in dynamic visco-elasticity in Example 11.
Figure 3:
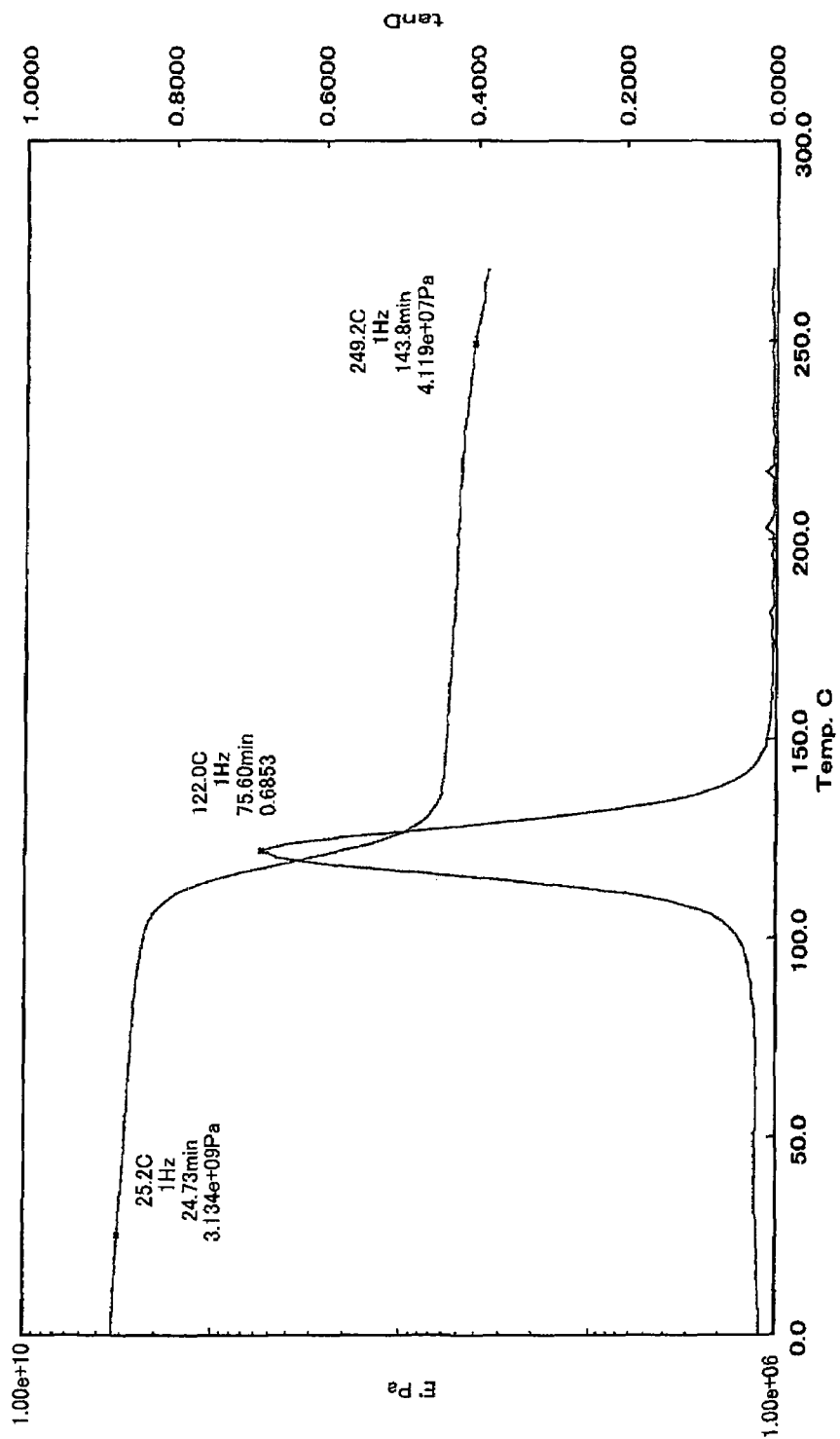
FIG. 3 is a chart of storage modulus E' and loss tangent (tan δ) in dynamic visco-elasticity in Comparative Example 5.
The present invention will be explained in detail.

Also, the maximum value of tan δ in a temperature range from 0 to 300° C. was read from the chart. The results are shown in Table 4. Also, as typical examples, the tan δ chart of Example 11 is shown in FIG. 2 and the tan δ chart of Comparative Example 5 is shown in FIG. 3.

Measuring Method

Storage Modulus and Loss Tangent Tan δ in Dynamic Visco-Elasticity

Measurements were performed using a dynamic visco-elasticity measuring device DMS6100 manufactured by Seiko Instruments Inc. by applying a sine wave bending of 1 Hz in a dual cantilever bending mode. The temperature range for measurement was 0 to 300° C. and the temperature rise rate was 2° C./min.

Moreover, Example 12 and Comparative Example 7 were subjected to tests for measuring flexural strength and fracture toughness.

Measuring Method

Flexural strength (MPa): Conforming to ASTM D790 (cross head speed: 2 mm/min.)

Fracture toughness (MPa m$^{1/2}$): Measured by the compact tension method conforming to ASTM D5045 (cross head speed: 1 mm/min.)

The both were measured using an Instron universal testing machines (manufactured by Instron). The results are shown in Table 5.

TABLE 4

| Raw materials | Example | | | | | |
| --- | --- | --- | --- | --- | --- | --- |
| | 7 | 8 | 9 | 10 | 11 | 12 |
| AER260 | 100 | 100 | 100 | 100 | 100 | 100 |
| Fluoroglucinol PGE | — | — | — | — | — | — |
| CTBN1008SPK | — | — | — | — | — | — |
| CTBN1009SPK | — | — | — | — | — | — |
| ACK | 8 | — | — | — | — | — |
| CHPK | — | 8 | — | — | — | — |
| CPK | — | — | 6 | — | — | — |
| CHK | — | — | — | 8 | — | — |
| LK | — | — | — | — | 4 | — |
| STK | — | — | — | — | — | 6 |
| DDK | — | — | — | — | — | 2 |
| EHC-30 | — | — | — | — | — | — |
| 1MZ | — | — | — | — | — | — |
| IK | — | — | — | — | — | — |
| RY200S | — | — | — | — | — | 2 |
| E'250° C.(Gpa) | 0.4868 | 0.5078 | 0.4654 | 0.4467 | 0.4430 | 0.4339 |
| E'25° C.(Gpa) | 2.754 | 2.730 | 2.704 | 3.043 | 2.893 | 2.727 |
| Retention factor of storage modulus | 17.7 | 18.6 | 17.2 | 14.7 | 15.3 | 15.9 |
| Maximum value of tan δ | 0.0778 | 0.0658 | 0.0570 | 0.0762 | 0.0653 | 0.0631 |

| Raw materials | Example | | | Comparative Example | | |
| --- | --- | --- | --- | --- | --- | --- |
| | 13 | 14 | 15 | 5 | 6 | 7 |
| AER260 | 100 | 50 | 100 | 100 | 100 | 100 |
| Fluoroglucinol PGE | — | 50 | — | — | — | — |
| CTBN1008SPK | — | — | — | — | — | — |
| CTBN1009SPK | — | — | 25 | — | — | — |
| ACK | — | — | — | — | — | — |
| CHPK | — | 30 | — | — | — | — |
| CPK | — | — | — | — | — | — |
| CHK | 4 | — | — | — | — | — |
| LK | — | — | — | — | — | — |
| STK | — | — | — | — | — | — |

TABLE 4-continued

| | | | | | | |
|---|---|---|---|---|---|---|
| DDK | 2 | — | — | — | — | — |
| EHC-30 | — | — | — | 10 | — | — |
| 1MZ | — | — | — | — | 8 | — |
| IK | — | — | — | — | — | 6 |
| RY200S | — | — | 2 | — | — | — |
| E'250° C.(Gpa) | 0.4300 | 1.084 | 0.1283 | 0.412 | 0.0339 | 0.4681 |
| E'25° C.(Gpa) | 2.822 | 2.851 | 1.366 | 3.134 | 3.488 | 2.886 |
| Retention factor of storage modulus | 15.2 | 38.0 | 9.4 | 1.3 | 1.0 | 16.2 |
| Maximum value of tan δ | 0.0576 | 0.0383 | 0.0703 | 0.6853 | 0.4966 | 0.0743 |

TABLE 5

| | Example 12 | Comparative Example 7 |
|---|---|---|
| Flexural strength (MPa) | 41.0 | 24.5 |
| Fracture toughness (MPa m$^{1/2}$) | 0.8 | 0.4 |

It was clearly observed in Examples 1 to 6 that in the anionic polymerizable compositions of the present invention, almost all epoxy compounds were consumed within 15 to 45 minutes and, along with this, high-molecular weight components were increased. Then, in Examples 1 to 6, a sharp peak of a high-molecular weight was observed within about 30 to 45 minutes after the start of the reaction to thereby find that the polymerization reaction did not terminate in the middle of the reaction but proceeds. These facts are clarified from FIG. 1 which is the GPC chart of Example 2 shown as the typical example. Also, the polymer was allowed to have a higher molecular weight very significantly. On the other hand, in Comparative Examples 1 to 4 using a conventionally usual anionic polymerization initiator, most of the epoxide was left unconsumed and also no progress in the production of a polymer having a higher molecular weight was made even if 240 minutes passed after the start of the reaction.

Also, it is understood from Examples 7 to 15 that the anionic polymerizable composition of the present invention has the physical property superior in storage modulus and retention factor of storage modulus. Comparative Example 3 uses an ion-containing polymer and exhibits excellent physical property, however, the compositions of the present invention exhibited the physical property equal to or far beyond those of the above Comparative Example. Therefore, an ion-containing polymer which is a polymer of a polymerizable organic weak acid may also be used as an epoxy curing agent, whereas the alkali metal salt of an organic weak acid monomer was confirmed to be more superior in an improvement in cured property. As to each of the cured products of Examples 7 to 15, when it was observed whether or not a peak at which the local maximum value of loss tangent tan δ was 0.1 or more, such a peak was not discriminated, showing that Tg disappeared in actual. It is also clarified that the above fact is shown by the chart of the loss tangent of Example 11 in FIG. 2 showing a typical example. FIG. 3 showing the chart of the loss tangent of Comparative Example 5 shows the physical property of a conventional epoxy cured product, and a Tg of 122° C. was observed.

Moreover, from the results of the flexural strength and fracture toughness in Example 12 and Comparative Example 7, the alkali metal salt of an organic weak acid monomer in the anionic polymerizable composition of the present invention was found to have the flexural strength and fracture toughness twice those of the case of using a potassium salt of an ethylene/methacrylic acid copolymer which was an ion-containing polymer, from which it was clarified that the physical property of the cured product was excellent.

INDUSTRIAL APPLICABILITY

The anionic polymerizable composition of the present invention uses an easily available alkali metal salt of a weak acid monomer having an organic group as a polymerization initiator, which ensures that an epoxy compound polymer having a high degree of polymerization can be produced, an epoxy compound polymer having the characteristics which have not been obtained by the conventional polymers can be provided and an epoxy resin improved in the characteristics such as heat resistance and a thermoplastic epoxy compound polymer by which new applications can be exploited can be provided, thereby contributing to a method of producing an anionic polymer of an epoxy compound and to an improvement in the characteristics of an epoxy resin.

The invention claimed is:

1. An anionic polymerizable composition consisting of an epoxy compound and an anionic polymerization initiator for anionically polymerizing the epoxy compound to form a cured polymer of the epoxy compound, wherein said initiator consists of a potassium salt or a sodium salt of at least one acid selected from the group consisting of lauric acid, n-caprylic acid, cyclohexanecarboxylic acid, 3-cyclohexylpropionic acid, versatic acid and 2-ethylhexanoic acid, and wherein said epoxy compound is a di- or more functional epoxy resin having at least one member selected from the group consisting of a glycidyloxy group, glycidylamino group and 3,4-epoxycyclohexenyl group, whereby the cured epoxy polymer has a maximum value of loss tangent of 0.1 or less at 300° C. or less at 1 Hz.

2. The anionic polymerizable composition according to claim 1, wherein said anionic polymerization initiator consists of a potassium salt or a sodium salt of at least one acid selected from the group consisting of lauric acid, cyclohexanecarboxylic acid, 3-cyclohexylpropionic acid, and versatic acid.

3. A sealing material for a semiconductor device comprising the anionic polymerizable composition according to claim 1 and an inorganic filler.

4. A reinforcing material comprising the anionic polymerizable composition according to claim 1 and at least one member selected from the group consisting of a stress-reducing agent and a rubber particle.

5. A cured polymeric resin of an epoxy compound which has a maximum value of loss tangent of 0.1 or less at 300° C. or less at 1 Hz, produced by anionically polymerizing an anionic polymerizable composition consisting of an epoxy compound and an anionic polymerization initiator for anionically polymerizing the epoxy compound to form a polymer of the epoxy compound, wherein said initiator consists of a potassium salt or a sodium salt of at least one acid selected from the group consisting of lauric acid, n-caprylic acid, cyclohexanecarboxylic acid, 3-cyclohexylpropionic acid, versatic acid and 2-ethylhexanoic acid, and wherein said epoxy compound is a di- or more functional epoxy resin having at least one member selected from the group consisting of a glycidyloxy group, glycidylamino group and 3,4-epoxycyclohexenyl group.

6. The cured polymeric resin of the epoxy compound according to claim 5, wherein said anionic polymerization initiator consists of a potassium salt or a sodium salt of at least one acid selected from the group consisting of lauric acid, cyclohexanecarboxylic acid, 3-cyclohexylpropionic acid, and versatic acid.

* * * * *